United States Patent [19]

Schroeder

[11] 4,139,685

[45] Feb. 13, 1979

[54] METHOD FOR THE PREPARATION OF POLYACRYLIMIDE AND POLYMETHACRYLIMIDE FOAMS

[75] Inventor: Guenter Schroeder, Ober-Ramstadt, Fed. Rep. of Germany

[73] Assignee: Rohm GmbH, Darmstadt, Fed. Rep. of Germany

[21] Appl. No.: 911,283

[22] Filed: May 31, 1978

[30] Foreign Application Priority Data

Jun. 10, 1977 [DE] Fed. Rep. of Germany ....... 2726259

[51] Int. Cl.$^2$ ............................................. C08J 9/14
[52] U.S. Cl. .................................. 521/88; 260/42.43; 428/315; 260/42.48; 521/95; 521/149
[58] Field of Search .................................. 521/149, 88

[56] References Cited

U.S. PATENT DOCUMENTS

| | | | |
|---|---|---|---|
| 2,831,820 | 4/1958 | Aase et al. ................ | 521/88 |
| 2,990,381 | 6/1961 | Meinel ................. | 521/149 |
| 3,001,956 | 9/1961 | Meinel ................. | 521/149 |
| 3,489,700 | 1/1970 | Knai et al. .............. | 521/88 |
| 3,513,112 | 5/1970 | Knai et al. .............. | 521/149 |
| 3,627,711 | 12/1971 | Schroeder et al. ....... | 521/149 |
| 3,673,129 | 6/1972 | Sagone et al. ........... | 521/149 |
| 3,708,444 | 1/1973 | Gangler et al. .......... | 521/88 |
| 3,734,870 | 5/1973 | Schroeder et al. ....... | 521/149 |
| 3,760,047 | 9/1973 | Gaeth et al. ............ | 521/149 |

FOREIGN PATENT DOCUMENTS

1045229 10/1966 United Kingdom ..................... 521/149
1078425 8/1967 United Kingdom ..................... 521/149

*Primary Examiner*—Morton Foelak
*Attorney, Agent, or Firm*—Curtis, Morris & Safford

[57] ABSTRACT

What is disclosed is a method of making a foamed polyacrylimide or polymethacrylimide polymer which comprises free-radically polymerizing a mixture comprising (A) a member selected from a first group consisting of acrylonitrile and methacrylonitrile and a member selected from a second group consisting of acrylic acid and methacrylic acid, the mol ratio of the members of said first group to the members of said second group being between 2:3 and 3:2, and (B) up to 20 percent, by weight of (A), of other free radically-polymerizable monomers copolymerizable therewith, said mixture further comprising from 1 to 15 percent, by weight of (A) and (B), of a foaming agent which is a monovalent aliphatic alcohol having 3 to 8 carbon atoms, to form a solid polymer, and then heating said polymer at a temperature from 170° C. to 250° C. until a foam is formed.

5 Claims, No Drawings

METHOD FOR THE PREPARATION OF POLYACRYLIMIDE AND POLYMETHACRYLIMIDE FOAMS

The present invention relates to a method for making polyacrylimide and/or polymethacrylimide foams by polymerizing a monomer mixture comprising acrylonitrile or methacrylonitrile together with acrylic acid or methacrylic acid, said mixture additionally containing a foaming agent and a free radical-forming initiator, and then heating the solid polymer so formed to a temperature from 170° C. to 250° C. to obtain a foamed synthetic resin essentially comprising acrylimide or methacrylimide units. The invention relates further to such foamed resins, which are distinguished by a high resistance to deformation by heat and by mechanical strength, and to laminates made therefrom.

Foams having acrylimide or methacrylimide units have already been described in the art. In their preparation, itaconic acid, maleic acid anhydride, citric acid, trichloroacetic acid, urea, thiourea, dicyandiamide, chloral hydrate, or water have been used as the foaming agents. Other art mentions only urea and dimethyl urea as foaming agents for polyimide foams. Elsewhere, formamide or monomethylformamide are taught as foaming agents. It has also been proposed to use formic acid as an additional foaming agent along with amide-type foaming agents such as urea or formamide in order to exclude any excess or deficiency of ammonia which is formed in part from these foaming agents.

None of the aforementioned foaming agents is satisfactory from every point of view. Of the foaming agents mentioned in the art, only urea gives technically useful foams. However, the foamable polymers prepared therewith have proved to be inhomogeneous and additional measures have proved necessary in order to achieve the homogeneity required for a uniform foaming. These measures, for example the addition of polymers or of highly dispersed silicic acid, make the preparation of a foamable material more difficult. Formamide and monomethylformamide do not have these advantages. However, in order to achieve homogeneity such large amounts of these foaming agents are required that, at the temperatures optimal for imidization, foams of an undesired low density are obtained. In addition, it has been found disturbing that small amounts of formic acid are formed from formamides during the foaming process. These make themselves unpleasantly noticeable when working up the foam by their odor and their etching action on the skin. The use of additional formic acid increases this disadvantage even more.

Thus, there is a need for foaming agents for the preparation of polyimide foams which do not have the disadvantages of the foaming agents heretofore known, which are technically accessible, and which are cheap.

It has now been found that monovalent aliphatic alcohols, preferably alkanols, having 3 to 8 carbon atoms in the molecule, which are added to a monomer mixture as a foaming agent in an amount from 1 to 15 percent by weight of the mixture fulfill this requirement. Among the aforementioned alcohols, the secondary and tertiary alcohols prove superior to the primary alcohols, particularly as concerns the uniformity and fineness of the pores. Aliphatic alcohols having 3 or 4 carbon atoms are preferred not only because of their low price but also because of their good effect according to the present invention.

Tert.-butyl alcohol has proved particularly advantageous. Other alcohols which can be used as foaming agents include propanol-1, propanol-2, butanol-1, butanol-2, sec.-butyl alcohol, pentanol-1, pentanol-2, i-pentanol-1, neopentyl alcohol, hexanol-1, hexanol-3, and ethylhexyl alcohol.

The use of tertiary alcohols, particularly of tert.-butyl alcohol, as a foaming agent for the preparation of certain foams is already known in the art. These foams are formed from alkyd resins and polyisocyanates. Strong mineral acids such as sulfuric acid are used as auxiliaries for the foaming process to catalyze the dehydration of the tertiary alcohol to the corresponding olefin. The olefin, as well as the cleaved water vapor, form the actual foaming agent. Since the foams according to the present invention are prepared without such an acid catalyst, a dehydration of any tertiary alcohol which may be used is not involved. The foaming agent effect is based practically exclusively on the alcohols present in the form of their vapors. The conversion into a polymer containing imide groups, which conversion occurs simultaneously with foaming, increases the softening temperature of the polymer to such a degree that when the material is cooled after conclusion of the foaming process and the alcohol vapor contracts and finally condenses, there is no shrinkage of the foam.

By the addition of 0.1 to 3 percent of water by total weight of the mixture, the pore structure may be made more coarse, if desired in order to improve adherability.

The alcohols which can be used according to the present invention as foaming agents — like formamide — effect such a thorough homogenization during polymerization that further measures to achieve homogenization are generally unnecessary. Nevertheless if in individual cases de-mixing phenomena occur during the polymerization, they can be supressed by small amounts of water. Also, small amounts of metal salts of acrylic acid or methacrylic acid, for example chromium-, zinc-, aluminum-, or magnesium-methacrylate, counteract the development of inhomogeneities.

In contrast to the foaming agents which cleave ammonia, the alcohols added according to the present invention do not take part in the transformation of a polymer, formed from acrylonitrile or methacrylonitrile and acrylic acid or methacrylic acid, into a polyacrylimide or polymethacrylimide. It is known that neighboring units having nitrile groups and carboxyl groups cyclize in the polymer chain at temperatures of 170° C. to 250° C. to form imide groups. An excess of acid units or nitrile units, or of further comonomers, reduces the degree of conversion into a polyimide. The advantageous properties of polyacrylimide or polymethacrylimide thus are most strongly evident if the mol ratio of acrylonitrile or methacrylonitrile to acrylic acid or methacrylic acid in the monomer mixture employed is as close as possible to 1:1. Good foam properties are obtained if this mol ratio is kept within the region between 2:3 and 3:2.

In addition to the component containing acrylonitrile or methacrylonitrile and acrylic acid or methacrylic acid, further free radical-polymerizable monomers can be employed in an amount of up to 20 percent by weight of that component. These further monomers include, for example, the lower esters of acrylic acid or methacrylic acid such as methyl acrylate, ethyl acrylate, or methyl methacrylate, as well as acrylamide, methacrylamide, and styrene.

The mixtures formed from the aforementioned monomers and foaming agents are advantageously polymerized in a manner conventional for bulk polymerization, i.e. in a flat chamber formed from glass plates and a sealing gasket passing around the edge thereof, or in a bag, for example formed from a film of regenerated cellulose or from a film of polyethyleneterephthalate, using the usual free radical forming initiators such as benzoyl peroxide, dilauroyl peroxide, tert.-butyl perpivalate, or azo-bis-isobutyronitrile at the temperatures and for the polymerization times usually employed therewith.

On heating the solid synthetic resin obtained by polymerization to a temperature of 170° C. to 250° C., the material foams and is extensively converted into a polyacrylimide or polymethacrylimide. Foam densities of, for example, 30 to 600 kg/m$^3$ are attained. A further advantage of the alcohols as foaming agents is that they permit higher foaming temperatures than do the foaming agents heretofore employed, such as formamide. At foam temperatures in the upper part of the aforementioned temperature interval, e.g. at 220° C. to 250° C., an extensive transformation of the polymer into a polyimide is achieved in a shorter time than is possible at foam temperatures of, for example, 180° C. to 200° C.

For modification of the foam properties, additional additives can be employed, such as highly dispersed silicic acid, asbestos flour, or conventional flame retardents such as those comprising halogen and/or phosphoric acid.

The foams prepared according to the invention are more suitable for the manufacture of laminated materials with so-called prepregs than are all other types of foam material heretofore known. By the term "prepregs" is to be understood (cf. DIN 61850) glass-fiber mats in sheet form, impregnated with a duroplast resin, which can be formed at elevated temperatures under pressure and can be hardened without further additives. These mats contain unsaturated polyesters or epoxy resins as the duroplast resin.

Usually, the fiber-reinforced resin forms a layer of 0.5 to 5 mm thickness. As reinforcing fibers they preferably contain mineral fibers, especially glass fibers or, for highly stressed laminates, carbon fibers. Synthetic fibers such as polyamide or polyester fibers or combinations of different fibers are in use, too. A more detailed description of appropriate fibers is given by P. H. Selden, "Glasfaserverstärkte Kunststoffe" (Springer-Verlag, Berlin 1967), pages 159–289. The fibers may be randomly distributed within the resin. Preferably, they form bundles, webs, or tissues. The main part of the fibers may be oriented in one direction to meet high mechanical stress.

Generally the fibers comprise from 20 to 80 percent by weight of the reinforced resin material, the lower range from 20 to 50 percent being used for general technical applications whereas the upper range from 50 to 80 percent is preferably employed in aircraft construction.

The remaining part of the reinforced material consists of a thermosetting resin, curable without further additives at elevated temperature. Thermosetting resins of this kind, such as unsaturated polyester or epoxide resins, are well known in the art and are described in detail by P. H. Selden (cited above, pages 5 to 82). For hardening, either high temperatures and high pressures with low press-times, or high temperatures and long press-times at low pressures, or long press-times and high pressures at moderate temperatures are necessary. Conventional polymethacrylimide foams cannot match these requirements in any way. On removal of the applied pressure, the foam springs back and the shaped piece bulges out. In contrast, the polymethacrylimide foams prepared according to the present invention give flawless shaped pieces if they are combined with prepregs under the following conditions:

| Foam Density (k/gm$^3$) | Prepreg Resin | Hardening Temp. (° C.) | Pressing Time (min.) | Pressure (N/mm$^2$) |
|---|---|---|---|---|
| 95 | Unsat. Polyester | 145 | 3 | 1.5 |
| 110 | Epoxide | 120 | 60 | 1.3 |
| 110 | Epoxide | 125 | 30 | 0.3 |
| | | 175 | 60 | 0.3 |

As a rule, a curing temperature of 140° C. or a pressure of 1 N/mm$^2$ or both are reached or even surpassed during the setting of the reinforced resin layer.

A better understanding of the present invention and of its many advantages will be had by referring to the following specific Examples given by way of illustration.

EXAMPLES 1–23

0.05 part by weight of dibenzoyl peroxide and 0.135 part by weight of tert.-butyl perpivalate are dissolved in 100 parts by weight of a mixture of 45 parts by weight of methacrylonitrile and 55 parts by weight of methacrylic acid (mol ratio = 1.05:1). In Examples 1–11 below, in each case 8 parts by weight of the different alcohols were added as a foaming agent. In Examples 12–23, in each case an additional 2 parts by weight of water are added. The mixtures are polymerized at 52° C. under vacuum in sealed ampules. After 24 hours, the samples were post-polymerized for an additional hour at 60° C. to 100° C. and for 1 hour at 100° C. Foaming took place for 2 hours at 220° C.

| Foaming agent | Foam density using 8 g of foaming agent per 100 g of monomers | | Foam density using 8 g of foaming agent and 2 g of water per 100 g of monomers | |
|---|---|---|---|---|
| | Example No. | (kg/m$^3$) | Example No. | (kg/m$^3$) |
| Propanol-1 | 1 | 45 | 12 | 200 |
| Propanol-2 | 2 | 110 | 13 | 25 |
| Butanol-1 | 3 | 100 | 14 | 65 |
| Butanol-2 | 4 | 55 | 15 | 25 |
| iso-Butanol | 5 | 80 | 16 | 40 |
| Pentanol-1 | 6 | 200 | 17 | 50 |
| Pentanol-2 | 7 | 80 | 18 | 40 |
| Pentanol-3 | 8 | 120 | 19 | 40 |
| iso-Pentanol-1 | 9 | 135 | 20 | 65 |
| Hexanol-1 | 10 | 360 | 21 | 75 |
| Hexanol-3 | 11 | 120 | 22 | 50 |
| 2-Ethyl-hexanol | | | 23 | 100 |

EXAMPLES 24–28

84.4 parts by volume of methacrylic acid were mixed with 66.3 parts by volume of acrylonitrile (mol ratio = 1:1). 50 parts by volume of this mixture were combined with 4 parts by volume of various alcohols and 1 part by volume of water. In each case, 0.1 percent by weight of tert. butyl-perpivalate and 0.05 percent by weight of dibenzoyl peroxide were added as accelerators. The solutions were sealed in ampules under vacuum and polymerized at 45° C. After 48 hours they were post-polymerized for 1 hour at 60° C. to 100° C. and for 1 hour at 100° C. The samples were subsequently foamed for 30 minutes at 220° C. or for 1 hour at 200° C.

| Examples | Foaming agent | Foaming temperature/time | Properties of the foam |
|---|---|---|---|
| 24 | Propanol-2 | 220°/30 Min. | strongly foamed, coarse pores |
| 25 | Propanol-2 | 200°/1 Hour | strongly foamed, medium pores |
| 26 | tert.-Butanol | 220°/30 Min. | strongly foamed, homogeneous foam, very fine pores |
| 27 | tert.-Butanol | 200°/1 Hour | like Example 26 |
| 28 | Pentanol-2 | 220°/30 Min. | strongly foamed, inhomogeneous medium to fine pore structure |

EXAMPLES 29-33

45 parts by weight of methacrylonitrile, 55 parts by weight of methacrylic acid, 0.05 part by weight of dibenzoyl peroxide, and 0.1 part by weight of azoisobutyronitrile are mixed. In each case 8 parts by weight of a mixture of tert.butanol and water, whose composition is given in the Table below, were dissolved in this solution. The solutions were sealed in ampules under vacuum and polymerized for 40 hours at 60° C., 1 hour at 60° C. to 100° C., and 1 hour at 100° C. Foaming was carried out for 2 hours at 200° C.

| Ex. No. | tert.-butanol (g) | Water (g) | Density (kg/m³) | Pore structure |
|---|---|---|---|---|
| 29 | 8 | — | 109 | very fine, uniform |
| 30 | 7 | 1 | 77 | very fine, uniform |
| 31 | 6 | 2 | 48 | fine, uniform |
| 32 | 5 | 3 | 58 | less fine, uniform |
| 33 | 4 | 4 | 240 | medium, non-uniform |

EXAMPLE 34

A mixture of
40.5 g of methacrylic acid,
31.5 g of methacrylonitrile,
18 g of styrene,
7 g of tert.-butanol,
2 g of water, and
0.2 g of dibenzoyl peroxide
is polymerized for 16 hours at 70° C. and two hours at 100° C. in a sealed glass ampule. The clear and solid polymer so formed is divided into two parts of which one is foamed for two hours at 200° C. to form a foam having a density of 90 g/l and the other of which is foamed for two hours at 220° C. to give a foam having a density of 40 g/l.

EXAMPLE 35

A mixture of
47 g of acrylic acid,
43 g of methacrylonitrile,
7 g of tert.-butanol,
2 g of water,
0.2 g of tert.-butyl perpivalate, and
0.05 g of dibenzoyl peroxide
is polymerized as in Example 34. Two portions of the polymer so obtained give the following products on foaming:
At 200° C., two hours, density = 70 g/l;
At 220° C., two hours, density = 50 g/l.

EXAMPLE 36

2700 parts by weight of an equimolar mixture of methacrylic acid and methacrylonitrile were mixed with 165 parts by weight of propanol-2, 70 parts by weight of tert.-butanol, 18 parts by weight of chromium-(III)-dimethacrylate-hydroxide, 2.7 parts by weight of tert.-butyl perpivalate, and 1.35 parts by weight of dibenzoyl peroxide. The mixture was polymerized as a layer of 1 cm thickness between two glass plates for 48 hours at 40° C. and for 2 hours at 100° C.

Two parts of the resulting polymer sheet were heated for two hours to 206° C. or 215° C., giving foam sheets of a density of 110 kg/m³ or 95 kg/m³, respectively.

A sheet having a size of 300 × 200 × 8 mm with a density of 95 kg/m³, cut from one of the foams prepared as above, was covered on both surfaces with unsaturated polyester prepregs (Menzolit type SPP 30 P) and cured for 3 minutes at 145° C. under a hydraulic pressure of 1.5 N/mm². The resulting laminate was taken from the press prior to cooling and was free of deformations.

Two pieces of foam with a density of 110 kg/m³ prepared as described above each having a size of 300 × 300 × 8 mm were covered on both sides with glass fiber epoxide resin prepregs (Ciba-Geigy, Fibredux 916 G and 918 G, respectively) and heated to 120° C. at 1.5 N/mm² for 60 minutes or to 125° C. for 30 minutes and to 175° C. for 60 minutes at 0.3 N/mm², respectively. In both cases, flawless laminates were obtained.

What is claimed is:
1. The method of making a foamed polyacrylimide or polymethacrylimide polymer which comprises free-radically polymerizing a mixture comprising
   (A) a member selected from a first group consisting of acrylonitrile and methacrylonitrile and a member selected from a second group consisting of acrylic acid and methacrylic acid, the mol ratio of the members of said first group to the members of said second group being between 2:3 and 3:2, and
   (B) up to 20 percent, by weight of (A), of other free radically-polymerizable monomers copolymerizable therewith, said mixture further comprising from 1 to 15 percent, by weight of (A) and (B), of a foaming agent which is a monovalent aliphatic alcohol having 3 to 8 carbon atoms, to form a solid polymer, and then heating said polymer at a temperature from 170° C. to 250° C. until a foam is formed.
2. A method as in claim 1 wherein said aliphatic alcohol is a secondary or tertiary alcohol.
3. A method as in claim 2 wherein said aliphatic alcohol is tert.-butyl alcohol.
4. A method as in claim 1 wherein said mixture additionally comprises from 0.1 to 3 percent of water, by weight of the total weight of the reaction mixture.
5. A method as in claim 1 wherein (A) consists of methacrylonitrile and methacrylic acid.

* * * * *